United States Patent
Oikawa et al.

(10) Patent No.: US 7,485,378 B2
(45) Date of Patent: Feb. 3, 2009

(54) MAGNETIC THIN FILM HEAD

(75) Inventors: Gen Oikawa, Kanagawa (JP); Kazue Kudo, Kanagawa (JP); Youji Maruyama, Saitama (JP); Hiromi Shiina, Ibaraki (JP)

(73) Assignee: Hitachi Global Storage Technologies Netherlands B.V., AZ Amsterdam (NL)

( * ) Notice: Subject to any disclaimer, the term of this patent is extended or adjusted under 35 U.S.C. 154(b) by 452 days.

(21) Appl. No.: 11/084,683

(22) Filed: Mar. 18, 2005

(65) Prior Publication Data
US 2005/0208340 A1  Sep. 22, 2005

(30) Foreign Application Priority Data
Mar. 19, 2004  (JP)  ............... 2004-079747

(51) Int. Cl.
*G11B 5/127*  (2006.01)
(52) U.S. Cl. ............... 428/812; 428/815.2; 360/125.08; 360/125.12; 360/125.24; 360/125.26; 360/125.45; 360/125.5; 360/125.58; 360/125.63
(58) Field of Classification Search ............. None
See application file for complete search history.

(56) References Cited
U.S. PATENT DOCUMENTS

| | | | |
|---|---|---|---|
| 4,748,089 A * | 5/1988 | Kumasaka et al. ........... 428/635 |
| 4,814,921 A * | 3/1989 | Hamakawa et al. .......... 360/126 |
| 5,126,907 A * | 6/1992 | Hamakawa et al. .......... 360/126 |
| 5,264,981 A * | 11/1993 | Campbell et al. ............ 360/126 |
| 6,132,892 A * | 10/2000 | Yoshikawa et al. .......... 428/812 |
| 6,778,358 B1 * | 8/2004 | Jiang et al. ................... 360/126 |
| 6,822,831 B2 * | 11/2004 | Ikeda et al. .................. 360/126 |
| 7,426,091 B2 * | 9/2008 | Okada et al. ............ 360/125.03 |
| 2005/0175864 A1 * | 8/2005 | Ikeda et al. .................. 428/829 |

FOREIGN PATENT DOCUMENTS

| | | |
|---|---|---|
| JP | 05-006834 A * | 1/1993 |
| JP | 2002-208514 A | 7/2002 |
| JP | 2002-217029 A | 8/2002 |

OTHER PUBLICATIONS

JPO Abstract Translation of JP 05-006834 A (PAT-No. JP405006834A).*
Derwent Abstract Translation of WO 2004/055784 A1 (Derwent Acc-No. 2004-543284).*
Machine Translation of JP 05-006834-A.*

* cited by examiner

*Primary Examiner*—Kevin M Bernatz
(74) *Attorney, Agent, or Firm*—Townsend and Townsend and Crew LLP; Rambod Nader

(57) ABSTRACT

A magnetic film capable of generating strong magnetic fields even in a high frequency region, a manufacturing method therefore and a thin film magnetic head capable of recording even in a high frequency region are provided. In one embodiment, the magnetic film is manufactured by using a 88FeNi film of 200 nm thick having minimum Hk of 0.32 Oe (25.6 A/m) as a main magnetic film and selecting a 20 wt % FeNi film of a similar FeNi alloy plating film having low Hk and low Hc as an interlayer material. A stacked film comprising (88FeNi/20FeNi)×10 layers is prepared so that the total thickness of the main magnetic film is 2 μm. The 88FeNi film is prepared by application of a DC current in a 88FeNi plating bath, and the 20FeNi film is prepared by pulse plating successively in the same bath.

3 Claims, 9 Drawing Sheets

MAGNETIC THIN FILM HEAD

CROSS-REFERENCES TO RELATED APPLICATIONS

This application claims priority from Japanese Patent Application No. JP2004-079747, filed Mar. 19, 2004, the entire disclosure of which is incorporated herein by reference.

BACKGROUND OF THE INVENTION

The present invention relates to a magnetic film, a manufacturing method therefore and a thin film magnetic head using the magnetic film. In particular, the present invention relates to a structure of a magnetic film capable of generating a strong magnetic field and a method of manufacturing the same.

Magnetic disk drives as information storage devices have been required to increase the data transfer rate and the recording density. Magnetic disks having a high coercivity property have been used as recording media, and therefore, it has been desired to make the recording frequency higher for a higher data transfer rate in the thin film magnetic head. To improve the recording magnetic field conversion efficiency of coil current as much as possible for making the recording frequency higher, it has been desired for the magnetic pole piece to use a material having characteristics of low coercivity in the direction of the difficult axis of magnetization (hereinafter referred to as Hc) or low anisotropic magnetic field (hereinafter referred to as Hk) in order to decrease the hysteresis loss. Further, it has been desired to use a material having high specific resistivity (hereinafter referred to as $\rho$) for the requirement of reducing the eddy current loss.

In addition, the recording characteristics to a high coercivity medium have been improved to attain higher recording density by using a material having a high saturation magnetic flux density (hereinafter referred to as Bs). JP-A No. 2002-217029 discloses a CoFeNi system alloy as a magnetic material capable of increasing the saturation magnetic flux density Bs to 2.0 T or more, and JP-A No. 2002-208514 discloses a NiFi system alloy as a magnetic material capable of increasing the saturation magnetic flux density Bs to 1.9 T or more.

BRIEF SUMMARY OF THE INVENTION

During recording operation of the thin film magnetic head, that is, during generation of recording magnetic fields, the magnetic pole piece generates heat due to a hysteresis loss and an eddy current loss. The magnetic pole piece expands thermally due to the heat generation to result in the problem of thermal protrusion such as fluctuation of the distance relative to the recording medium and, further, collision against the medium. This is a factor that hinders the decrease in the flying height of the magnetic head and causes a fatal problem of hindering an increase in the operation speed and an increase in the recording density of the magnetic disk apparatus. Further, it also results in a problem of side erasure in which information in the tracks adjacent to the recording track is erased upon recording of data along with an increase in the magnetic field output due to an increased Bs.

Heretofore, CoNiFe system alloy plating (Hc 10 to 25 Oe (Hc 800 to 2000 A/m), Hk 15 to 25 Oe (1200 to 2000 A/m), $\rho$ 15 to 20 $\mu\Omega$cm) having high Bs (2.0 to 2.4 T) has been used for the magnetic pole end, of the magnetic pole piece, near the gap. On the other hand, 52 to 58 wt % FeNi system alloy plating (Hk 5 to 100 Oe (400 to 800 A/m), Bs 1.65 to 1.75 T) has been used for the magnetic core.

Further, in recent years, development for the mass production has been successful in 84 to 92 wt % FeNi system alloy plating having low Hc (0.5 to 1.5 Oe (40 to 120 A/m)), low Hk (0.5 to 1.5 Oe (40 to 120 A/m)), and high Bs (2.1 to 2.3 T), thereby attaining the improvement of the characteristics of high recording frequency. Occurrence of clouding and blackening caused by roughening on the plated surface has been suppressed at: Fe$\geq$60 wt % by controlling the plating bath pH to an acidic region of 1.5 to 2.3 thereby enabling the formation of a lustrous film. For the frequency characteristics of the thin film magnetic head using the material described above, it has been found that the frequency increases as: f=700 to 800 MHz in 84 to 92 wt % FeNi compared with f=500 to 600 MHz in 52 to 58 wt % FeNi, at L=0.006 pH as an evaluation reference and that it is further improved as far as the frequency: f=900 to 1000 MHz when a heat treatment is applied. That is, the recording magnetic field is not decreased at higher frequencies and a necessary magnetic field output can be obtained. It can be confirmed that the amount of protrusion, that is, the amount of heat expansion in the recording operation is decreased by 2 to 5 nm, and the problem of the thermal protrusion can be reduced. A structure of engraving the lower magnetic pole piece near the recording gap to decrease the leakage magnetic field is adopted as a countermeasure for the side erasure.

To further increase the speed and recording density of the magnetic disk drive, it is necessary for the magnetic pole piece of the thin film magnetic head to use a material capable of further reducing the hysteresis loss and eddy current loss in a region of a high recording frequency. The characteristics of the material are required to have Low Hc, low Hk, high $\rho$, and high Bs.

In order to solve the problems, a lustrous and uniform Fe—Ni system alloy plating film in a Fe 84 to 92 wt % compositional region has been developed in recent years. Based on the material, it has become possible to adopt a 88Fe12Ni plating layer having low Hc of 0.8 Oe (64 A/m) and low Hk of 1.0 Oe (80 A/m) (Bs 2.2 T, $\rho$35 $\mu\Omega$cm) for the upper magnetic core; a 88Fe9Ni3Co plating film having high Bs of 2.3 T (Hc 1.2 Oe (96 A/m), Hk 1.4 Oe (112 A/m), $\rho$30 $\mu\Omega$cm) for the upper and lower magnetic pole ends; and a 88Fe11Ni1Cr plating film having high $\rho$ of 40 $\mu\Omega$cm (Hc 1.4 Oe (112 A/m), Hk 2.0 Oe (160 A/m), Bs 2.0 T) for the lower magnetic core. However, they cannot satisfy the recording characteristics sufficiently in a longitudinal recording type or, further, in a vertical recording type head requiring a higher frequency of: f-2000 MHz relative to usual existent recording frequency of: f-800 MHz.

As can be seen from the compositions and the respective magnetic characteristics thereof described above, while the addition of Co to the 88Fe12Ni film having minimum Hc and Hk can increase Bs, this increases Hc and Hk and lowers $\rho$. Further, while the addition of Cr can increase $\rho$, this increases Hc and Hk and lowers Bs. This is because the magnetic characteristics often depends on the crystal structure of the material composition and, for the CoNiFe system alloy plating, the crystal structure has a bcc structure at high probability in the compositional region having: Bs$\geq$1.8 T, and Hc cannot be decreased by the bcc structure. While development of the fcc structure has been attempted so far based on the modification for the composition and the deposition conditions for plating, clouding or blackening caused by surface roughening and the crystal structure could not be confirmed, so that the development could not but be abandoned. It is considered that lowering of Hc and Hk, and increasing $\rho$ and Bs all together are contrary to each other in view of the crystal structure, that is, the material composition. Heretofore, materials having effective magnetic characteristics have been adopted while putting the suitable materials to the suitable places in the upper and lower magnetic cores and the upper and the lower magnetic pole ends as the magnetic pole piece respectively.

On the other hand, a countermeasure for side erasure has been required to make the writing pole piece (upper magnetic pole end) narrower and more accurate, and steep competition has been made for the development of photolithography for forming the resist frame. Further, the structure of decreasing the leakage magnetic fields has becomes necessary, and a trimming technique of engraving the lower magnetic pole end near the recording gap by an ion milling method to adjust the pole width (pole end width) has been developed. However, removal of re-deposition film formed during engraving milling for size control deteriorates the dimensional accuracy and the shape. A thin film magnetic head capable of overcoming the difficulties described above and a manufacturing method therefore have not yet been provided.

In view of the difficulties described above, it is a feature of the present invention to provide a magnetic film capable of generating strong magnetic fields even in a high frequency region and a manufacturing method therefore.

The invention further intends to provide a thin film magnetic head capable of recording also in a high frequency region.

A high performance magnetic film and a high performance thin film recording head have been attained as the means for solving the problem in accordance with the invention by enhancing the characteristics of a magnetic pole piece by the improvement in the film constitution instead of the existent improvement in the magnetic characteristics due to the material composition as in the prior art. The recording operation of the thin film magnetic head is to transmit magnetic fields induced from the coil current to a recording medium and it is desired that the induced magnetic fields can be controlled only in the direction of the film surface. The direction of the film thickness constitutes a factor for inhibiting the conduction of the magnetic field.

Refinement of the crystal grain size of a magnetic film constituting the magnetic pole and the magnetic core is one of the techniques, and smaller Hk and Hc are necessary for attaining high magnetic field conductivity. It has also been confirmed that the effect of low Hc and low Hk in the 84 to 92 wt % FeNi film is obtained not only by the composition but also by the crystal grain size. According to embodiments of the invention, it is possible to make the grain size uniform and facilitate control of Hk in the direction of the film surface by reducing the thickness of the magnetic film and preventing growth of the crystal grain size. In addition, the material not hindering the recording magnetic field and the film thickness thereof are selected for the interlayer material and a structure is adopted in which magnetic films are stacked into a multi-layer or at least four layers.

The specification for the structure of the thin film magnetic field is designed in view of the magnetic field intensity necessary for the recording medium and the thickness of the multi-layered film, that is, the number of lamination is optimized. The film constitution for each of the magnetic pole pieces shown below is effective.

In the upper magnetic core, a low Hk, low Hc multi-layered film has been obtained by using an FeNi system thin plating film of a compositional region having low Hk as a main magnetic film in the upper magnetic core and using an FeNi system thin plating film of a compositional region different from that of the low Hc main magnetic film as the inter-layer film. For the composition, stacked films can be formed from the same plating bath by modulation of the plating current and it is excellent as a mass production process.

In the upper magnetic pole piece, a low Hc and high ρ multi-layered film has been obtained by using a FeCo system or FeCoNi system plating thin film having high Bs as a main magnetic film for the upper magnetic pole piece and using a FeCoNi system or FeNi system plating thin film of a compositional region having low Hc as the inter-layer film.

In the lower magnetic pole piece, a high Bs and high ρ multi-layered film has been obtained by using a FeCo system or FeCoNi system plating thin film having high Bs as a main magnetic film and using a thin film of a non-magnetic material of NiP, Cr, Pd, Rh, Ru, Re, Mo, or Ir, or an alloy film mainly comprising the metal described above as the interlayer film. Since a gap effect is caused in a case of an increased thickness of the non-magnetic film to remarkably deteriorate the recording performance, strict control of the film thickness is required.

Further, with an aim of conducting the recording magnetic fields efficiently and high-accurately to a determined recording track of a medium, a structure having a Bs gradient in which Bs is highest near the recording gap and Bs is lowered as it recedes from the gap in the upper magnetic pole piece or the lower magnetic pole piece has been manufactured.

In the lower magnetic core, a low Hk and high ρ multi-layered film has been obtained by using a FeNi system plating thin film of a compositional region having low Hk as the main magnetic film and using a thin film of non-magnetic material of NiP, Cr, Pd, Rh, Ru, Re, Mo, or Ir or a thin alloy film mainly comprising the metals described above as the interlayer film.

A thin film magnetic head mounting the magnetic pole described above thereon has been manufactured and it has been confirmed that the head can be used effectively in a high recording frequency band without deterioration in the recording performance.

According to the invention, a magnetic film capable of generating strong magnetic fields in a high frequency region, as well as a manufacturing method therefore can be provided. Further, a thin film magnetic head capable of recording in a high frequency region can be provided.

DETAILED DESCRIPTION OF THE INVENTION

Figure 7:
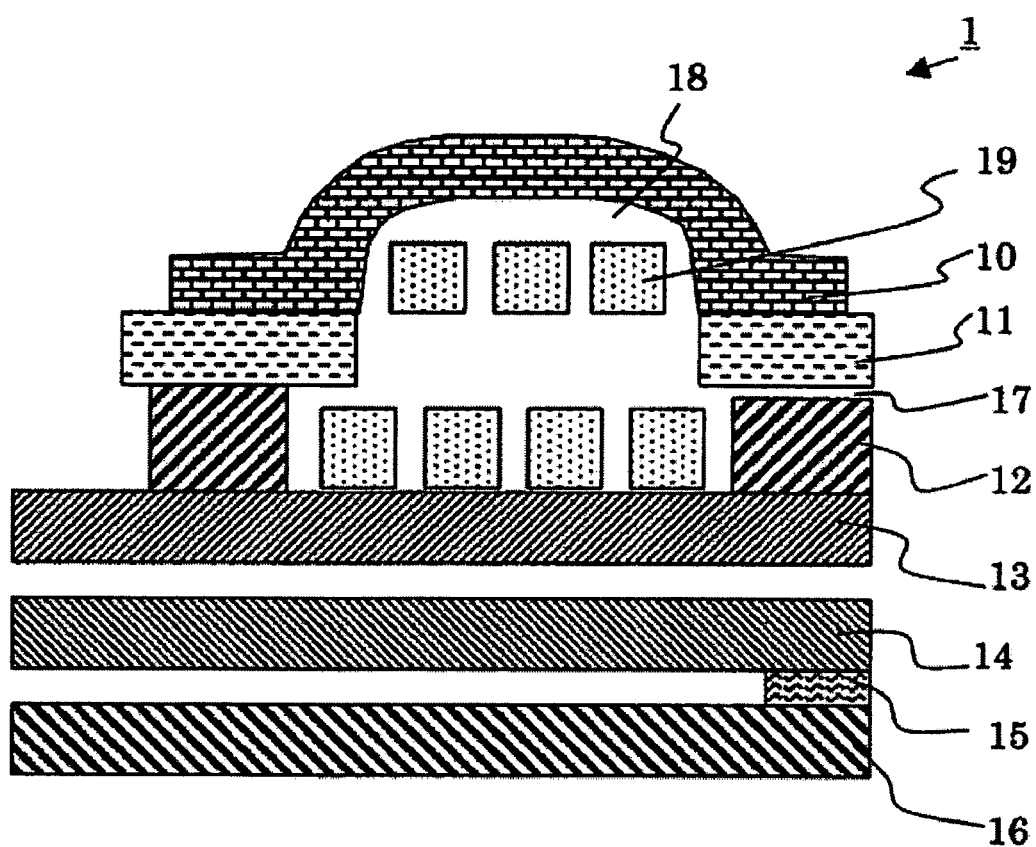
FIG. 7 is a cross-sectional view of a film magnetic head according to an embodiment of the invention.

FIG. 7 shows a configuration of a thin film magnetic head 1 in one embodiment of the present invention using a magnetic film according to one embodiment of the invention as a magnetic pole piece. The recording head comprises: a lower magnetic core 13; lower magnetic pole pieces 12 situated at the top end (on the side of ABS) and a back gap of the lower magnetic core 13; upper magnetic pole pieces 11, one of which is opposed at the top end by way of a magnetic gap film 17 to the lower magnetic pole 12 and the other of which is connected at the back gap with the lower magnetic pole 12; an upper magnetic core 10 for connecting the top end and the back part of the upper magnetic pole 11; and conductor coils 19 situated being covered with an insulator 18 between the lower magnetic core 13 and the upper magnetic core 10. A read head is disposed adjacent to the recording head and comprises a lower magnetic shield 16, an upper magnetic shield 14 and a magnet resistive sensor (GMR) 15 situated by way of a gap material between the lower magnetic shield 16 and the upper magnetic shield 14. The write head is stacked above the read head to constitute a thin film magnetic head 1. However, each of the write head or the read head is also referred to as a thin film magnetic field individually.

A method of manufacturing a magnetic film constituting each of the magnetic cores and the magnetic pole pieces for the write head of the thin film magnetic head 1 is to be described below. A ceramic substrate of 5 inch diameter was used as a substrate and a lamination film (Au/Cr=12/7 nm) was formed as a conduction under layer film for plating by a sputtering method. Plating conditions were set at a plating bath temperature of 30° C.±1° C., to a bath composition containing $Fe^{2+}$ from 5 to 15 g/L, $Ni^{2+}$ from 2 to 10 g/L, sodium saccharine from 1.5±0.5 g/L, boric acid from 25±5 g/L, and sodium chloride of 25±5 g/L, a plating bath volume in a storage vessel of 250 L (with $N_2$ stirring purging). In this case, the ratio of Fe ion concentration and Ni ion concentration in the plating bath is preferably: Ni ion/Fe ion≧0.4.

A constant current power source was used for a plating power source and the time and the current value could be set for 14 steps by using a personal computer. The time can be set by 1 sec unit in a case of DC current and 1 msec unit in a case of pulsative current, and the current could be set by 1 mA unit. The applied magnetic field during plating was 1 KOe (80 k A/m). The film thickness and the film composition were measured by using a fluorescent X-ray analyzer, the magnetic characteristics Hc, Hk and Bs were measured by using a thin film B—H tracer, and the specific resistivity ρ was measured by using thin film resistance measuring equipment.

Figure 1:
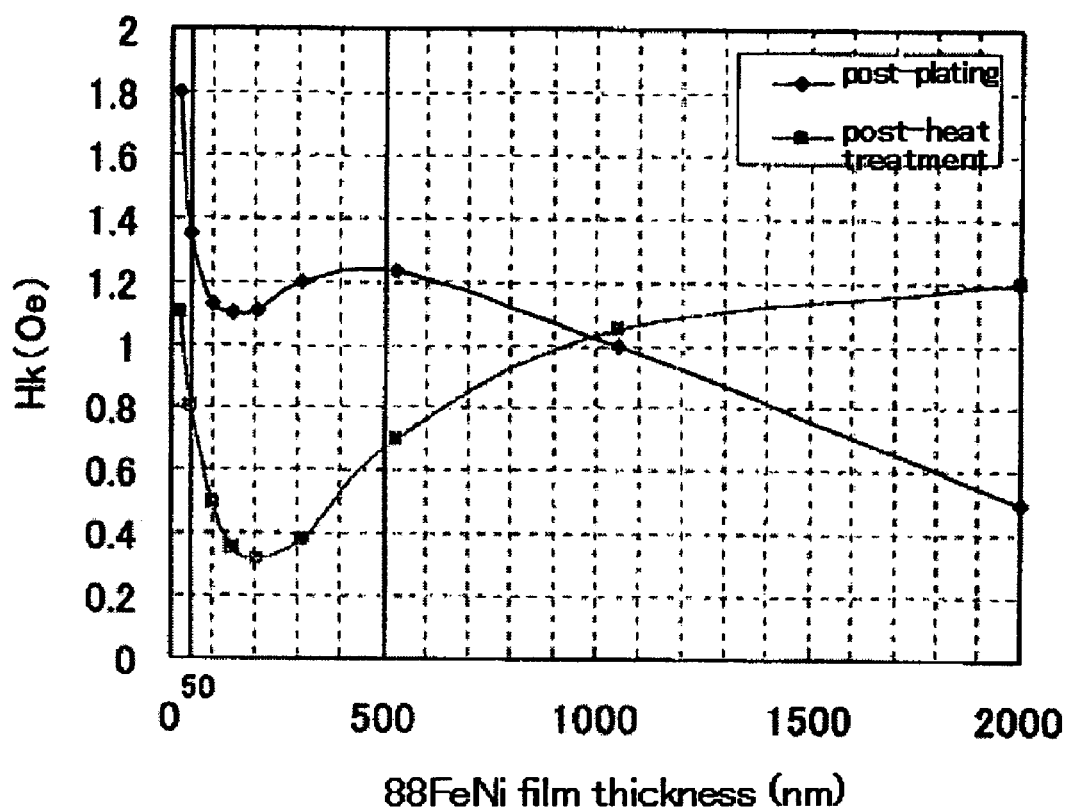
FIG. 1 is a graph showing the dependence of anisotropic magnetic field Hk on the film thickness in 88FeNi alloy plating.

A first embodiment is described below by way of example of applying the invention to the upper magnetic core 10. FIG. 1 shows a relation between the film thickness and Hk of an 88 wt % FeNi plating film adopted so far. This relation was obtained by preparing plating films having various film thicknesses and measuring Hk thereof. The post-plating characteristic exhibits Hk of 0.50 Oe (40 A/m) for the film thickness of 2000 nm used so far. HK is increased, along with reduction in the film thickness, to 1.25 Oe for the film thickness of 500 nm. However, when the thickness of the film is further reduced, Hk is decreased to Hk 1.10 Oe (88 A/m) for the thickness of 200 nm. Then, when the thickness is further reduced, Hk is increased again to 1.80 Oe (144 A/m) for the film thickness of 20 nm. On the other hand, it is confirmed that when a heat treatment under magnetic field is applied to the films (applied magnetic field: 3 KOe (240 kA/m), at a temperature of 250° C. for 3 hours), the dependence of Hk on the film thickness is different from that of post-plating and the Hk of the plating film is increased to 1.20 Oe (96 A/m) for the film thickness of 2000 nm but Hk is lowered as the film thickness is reduced to show a minimum value of Hk: 0.32 Oe (25.6 A/m) for the film thickness of 200 nm. Then, Hk is increased again along with further reduction of the film thickness to Hk: 1.10 Oe (88 A/m) for the film thickness of 20 nm.

Figure 2:
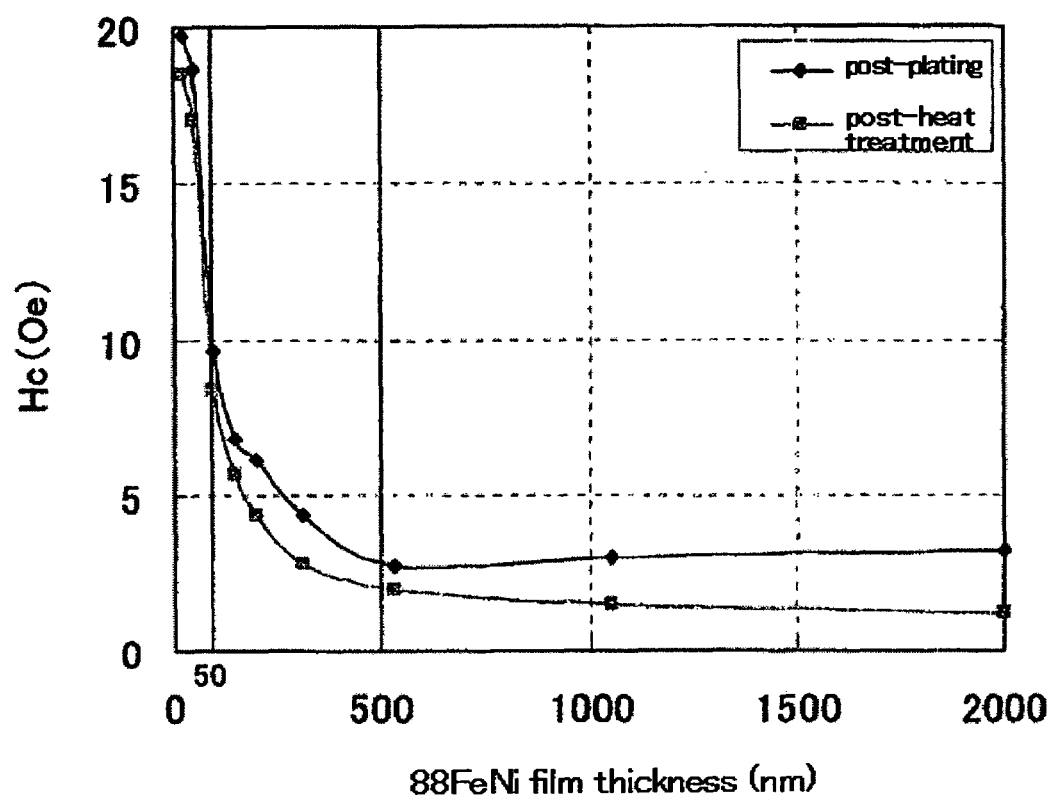
FIG. 2 is a graph showing the dependence of coercivity Hc on the film thickness in 88FeNi alloy plating.

FIG. 2 shows the relation between the films and Hc. Hc to film thicknesses exhibit similar behavior between post-plating and post-heat treatment under magnetic field. Hc is lowered when the heat treatment under magnetic field is applied for any of the film thicknesses. It is probable that the existence of the dependence of Hk on the film thickness for the film composition and the change of the trend in the dependence on the thickness by the heat treatment under magnetic field are caused by the nonuniformity of the film composition and the crystal grain size in fine regions. In the magnetic film prepared under applied magnetic field of 1 KOe (80 KA/m) during plating, magnetic anisotropy is caused by the treatment under the strong magnetic field of 3 KOe (240 KA/m) and the effect is higher and the Hk is lowered as the film thickness is reduced (≦500 nm). However, it is probable that since the nonuniformity of the film composition and the crystal grain size is increased in the fine region along with an increase in the film thickness, the effect is low to inhibit the lowering of Hk and Hk is increased instead.

On the other hand, in a region of the film thickness of less than 50 nm, the deposition state of plating was instable and clouding caused by surface roughening or fluctuation of the film thickness and the composition were confirmed. While the layer at the initial stage of plating comprises such material for any film thickness, it is considered that the magnetic film of the invention that lowers Hk by plating up to the thickness of about 50 to 500 nm is effective as the upper magnetic core 10.

Figure 3:
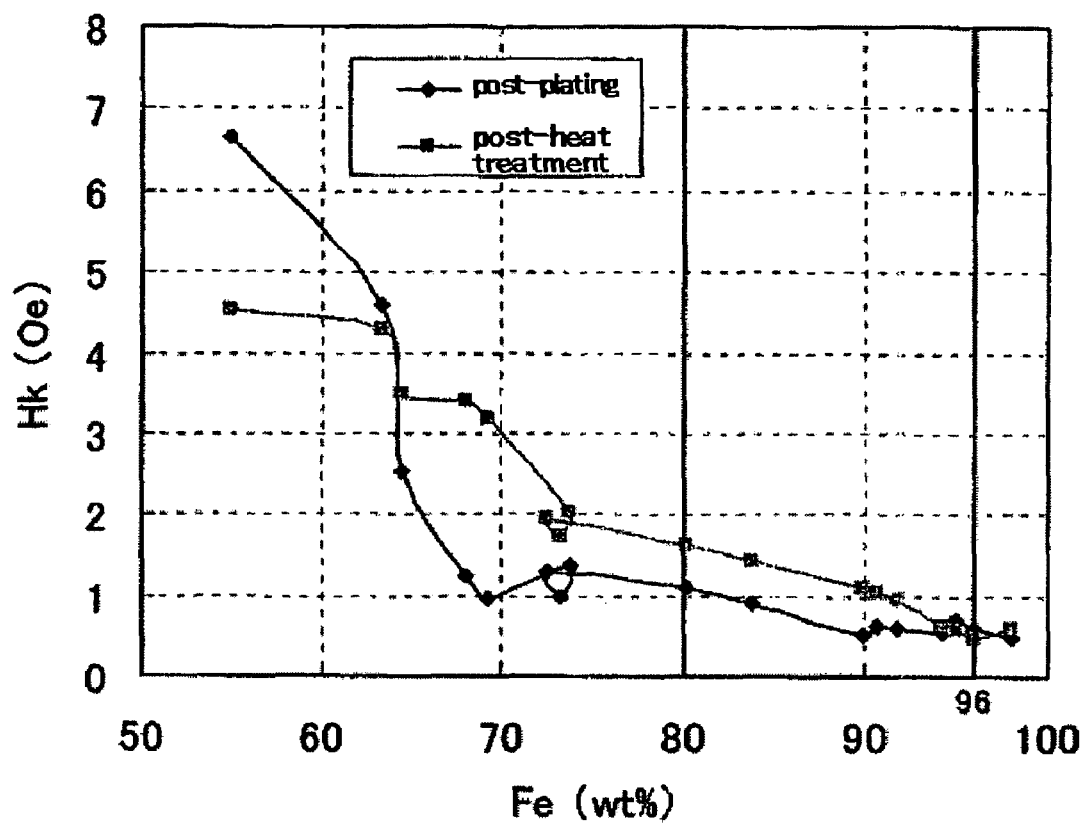
FIG. 3 is a graph showing the dependence of anisotropic magnetic fields Hk on Fe composition in FeNi alloy plating.

In FeNi alloy plating, Fe composition was modified and the dependence of Hk on the film composition was measured. FIG. 3 shows the result. While 88±4 wt % FeNi film was used so far for the aimed value of: Hk≦1.5 Oe (120 A/m) (post-heat treatment under magnetic field), the effective compositional region is extended and a plating film of 88±8 wt % FeNi can be used for the thin film region from about 50 to 500 nm. While Hk>1.5 Oe (120 A/m) is established for Fe<80 wt %, blackening due to surface roughening occurred for Fe>96 wt %.

The 88±8 wt % FeNi plating film having a film thickness of from about 50 to 500 nm and Hk≦1.5 Oe (120 A/m) (post-heat treatment under magnetic field) requires a total film thickness of 2 μm or more for the magnetic field output as the upper magnetic core. However, in a film prepared by merely repeating plating and water washing or a film prepared by intermittent plating current, the magnetic characteristics were equivalent to those of the film prepared by continuous plating up to 2 μm. Accordingly, in a case of stacking the thin film, an FeNi plating film of other material or other composition has to be used as an interlayer material. However, it is probable that a thick interlayer material severely inhibits magnetic field conduction by the gap effect and, on the other hand, an extremely thin interlayer material results in continuity between the main magnetic films thereby making characteristics equivalent to those of usual cases, so that the film thickness has to be optimized strictly.

Figure 4:
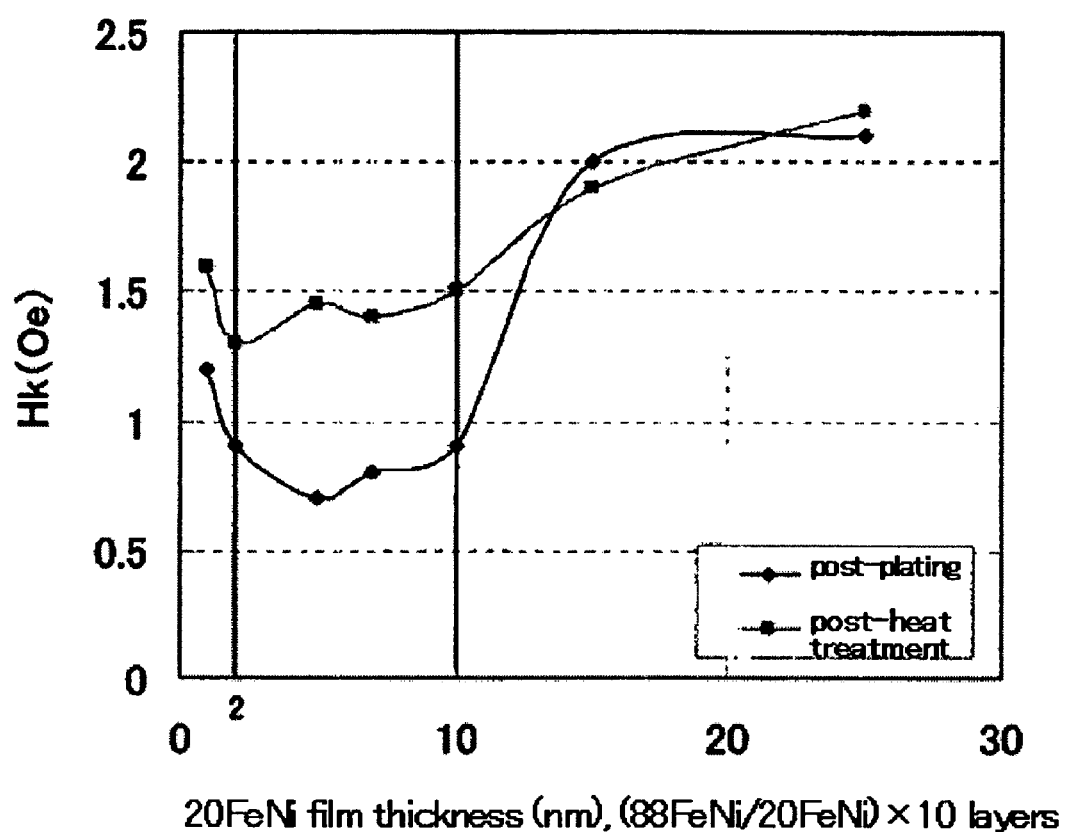
FIG. 4 is a graph showing the dependence of anisotropic magnetic fields Hk on the film thickness of the interlayer material in a stacked magnetic film according to an embodiment of the invention.

At first, a 20 wt % FeNi film of a similar FeNi system plating film having low Hk and low Hc was selected as the intermediate material. This film is a material generally referred to as permalloy and has a feature that magnetic strain constant $\lambda=\pm 0$. FIG. 4 shows Hk of the stacked film relative to the thickness of the 20 wt % FeNi film. 88 FeNi of 200 nm film thickness to provide minimum Hk of 0.32 Oe (25.6 A/m) was used as the main magnetic film, and a stacked film comprising (88 FeNi/20 FeNi)×10 layers was prepared such that the thickness of the main magnetic films was 2 µm in total. A 88FeNi film was prepared by a DC current in a 88FeNi plating bath, and pulsative plating was conducted successively in one identical bath and the 20FeNi film could be prepared.

Current value and time, and DC/pulse could be set respectively for 10 layers by using a personal computer. (88FeNi/20FeNi)×10 layers=(DC current 220 mA, pulse current 100 mA)×10 layers=(6 sec/nm×88FeNi film thickness/30 sec/nm×20FeNi film thickness)×10 layers. The total plating time is 3 hours and 50 min in a case of 200 nm thickness for the 88FeNi film and 6 nm thickness for the 20FeNi film. Since the plating method can be conducted automatically for 3 hours and 50 min in one identical plating bath, this is excellent as the mass production process. Further, Ton/Toff=700 ms/300 ms and Ion/Ioff=100 mA/5 mA were adopted as pulse plating conditions, and Ioff current was applied during Toff to prevent etching for the layer to be plated.

It can be seen from the result in FIG. 4 that Hk was lowered at a film thickness of from about 2 to 10 nm for the 20FeNi film and Hk was increased at the film thickness of less than 2 nm and the film thickness of more than 10 nm. It is considered that lowering of Hk is inhibited at the film thickness of 2 nm or less since 88FeNi plating is conducted on the initial 20FeNi layer which is not uniform both in the film thickness and the film composition, and at the film thickness of more than 10 nm since the gap effect is caused. A similar trend was shown also after the heat treatment under magnetic field to obtain characteristics having Hk≦1.5 Oe (120 A/m) also in stacking while Hk was increased.

Further, for the FeNi film as the interlayer material, as a result of measuring Hk for the stacked layer (88FeNi/xFeNi) with the Fe content X changed, Hk was equivalent to that of a single layered film of the same composition as that of the interlayer material for more than 70 wt % of Fe with no effect of stacking, and Hk was greater than 1.5 Oe (120 A/m) irrespective of the film thickness for 70 wt %>Fe>60 wt %. Accordingly, it is concluded that the FeNi film containing 60 wt % or more Fe is appropriate as the interlayer material.

A thin film magnetic head using the upper magnetic core 10 comprising (88FeNi/20FeNi)×10 layers was prepared as shown in FIG. 7. An FeCoNi system alloy plating film was used for the upper magnetic pole piece 11, a FeCo system alloy plating film was used for the lower magnetic pole piece 12, and an FeNi system alloy plating film was used for the lower magnetic core 13. Alumina was used for the magnetic gap film 17, an organic insulation material was used for the insulator 19, and copper was used for the conductor coils 20.

Figure 5:
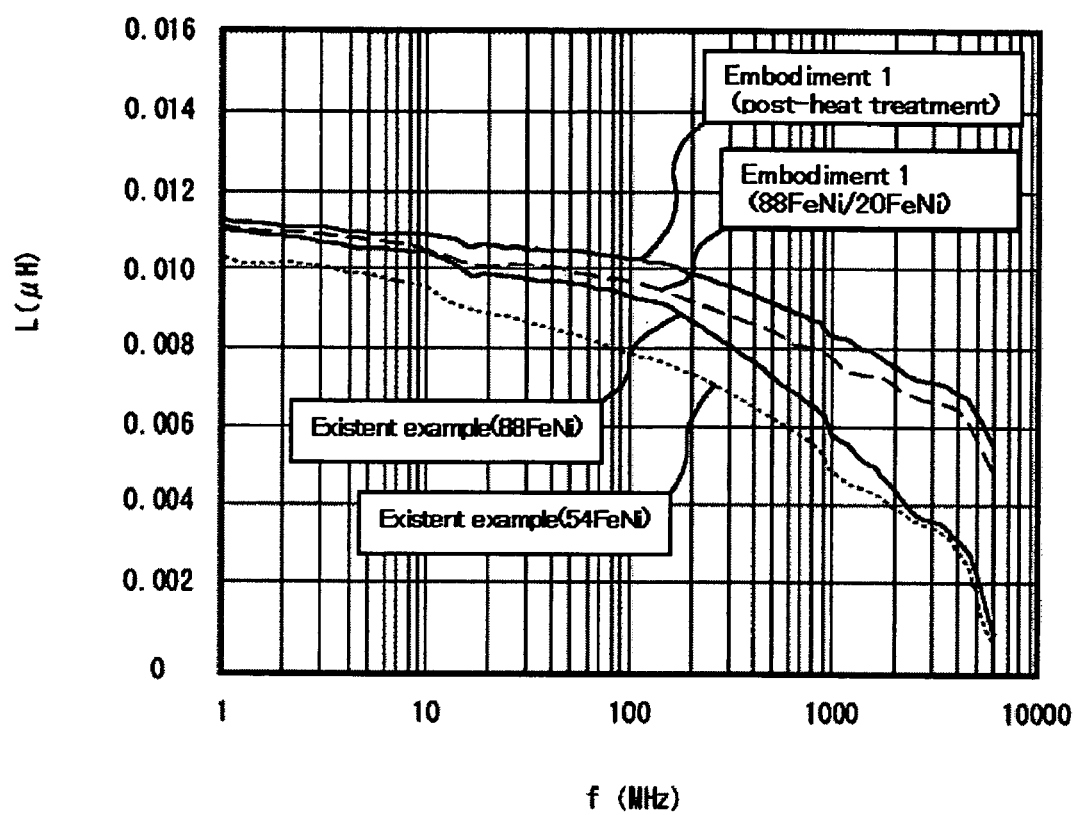
FIG. 5 is a graph showing the dependence of L characteristics on the recording frequency in a thin film magnetic head according to an embodiment of the invention.

FIG. 5 shows the frequency characteristics of the upper magnetic core 10 of the thin film magnetic head 1. In the measurement, current is supplied to the conductor coils 20 of the thin film magnetic head 1 in the state of a wafer before slider fabrication and the magnetic characteristics L (µH) generated in the upper magnetic core 10 with the current frequency being changed was measured. At an aimed evaluation reference of: L=0.006 µH, while f=500 to 600 MHz in the existent 54 wt % FeNi, and f=900 to 1000 MHz in the existent 88 wt % FeNi (with heat treatment under magnetic field), it has been found that the frequency increased as f=4000 to 5000 MHz for (88FeNi/20FeNi)×10 layers in this embodiment and it further improved to: f=5000 to 6000 MHz when a further heat treatment was applied. That is, the recording magnetic fields are not decreased relative to high frequencies. It has been found that a decrease in the recording magnetic fields could be suppressed further by applying a heat treatment.

Figure 6:
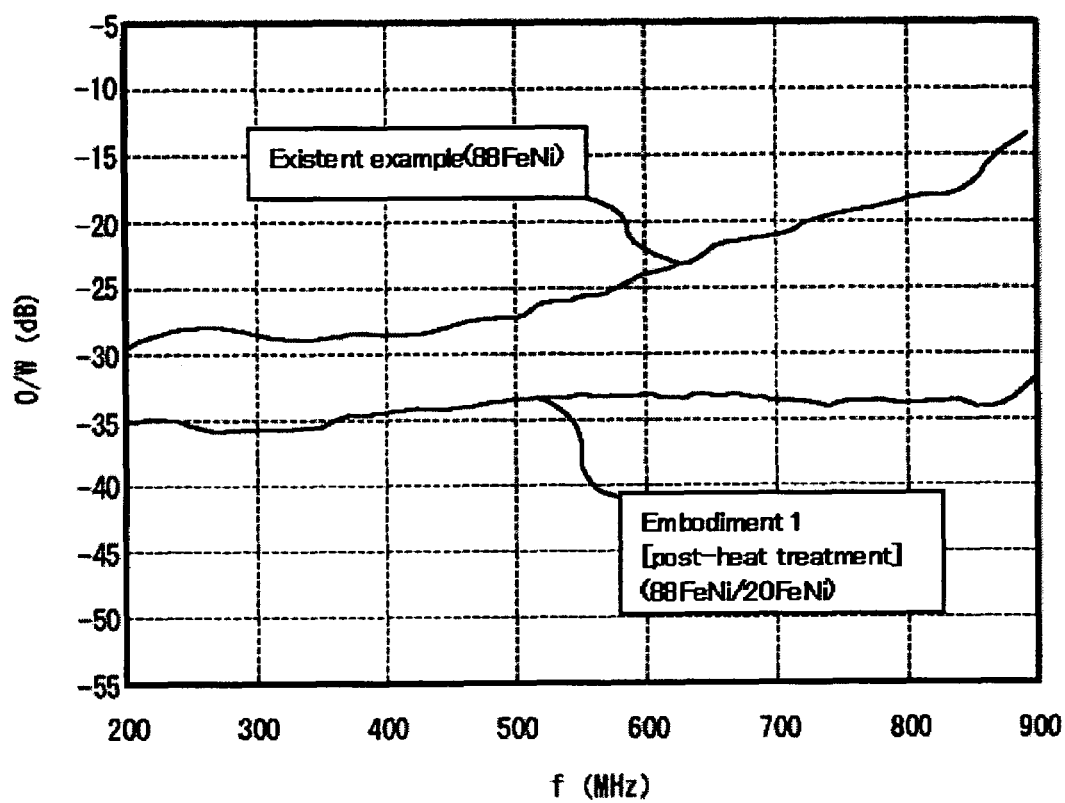
FIG. 6 is a graph showing the dependence of O/W characteristics on the recording frequency in a thin film magnetic head according to an embodiment of the invention.

Successively, the thin film magnetic head was put to slider fabrication, recording operation was performed on a recording medium and overwrite characteristics representing the recording performance (hereinafter referred to as O/W characteristics) were measured. FIG. 6 shows the O/W characteristics at the recording frequency: f=200 to 900 MHz. The O/W characteristics are decreased from −28 dB to −14 dB along with an increase of the frequency in the existent magnetic core. That is, the recording performance is deteriorated. However, the O/W characteristics show less reduction, that is, from −35 dB to −33 dB also at higher frequencies in the magnetic core of this embodiment comprising: (88FeNi/20FeNi)×10 layers. That is, it is possible to provide output without lowering the recording magnetic fields. Further, when the thermal protrusion of the thin film magnetic head was measured, the protrusion height in the direction of the air bearing surface was 10 nm relative to 15 nm of the existent thin film magnetic head, namely, it could be decreased by 5 nm. This is probable because of the effect of decreasing the hysteresis loss and the eddy current loss due to lower Hc and lower Hk, thereby decreasing the heat generation in the magnetic core.

A second embodiment is described below by way of example of applying the invention to the upper magnetic pole 11. Most important characteristics required for the magnetic pole piece are high Bs. The high frequency characteristics were improved by reducing the film thickness while Hk and Hc were high Hk as 18 Oe (1440 A/m) and Hc 15 Oe (1200 A/m) respectively. A 66Fe-33Co-1Ni plating film having 2.4 T of Bs of 100 nm thick for the material of the main magnetic film and a 56Co-19Ni-25Fe plating film (Bs: 1.8 T, Hk: 15 Oe (1200 A/m), Hc: 1 Oe (80 A/m) of 5 nm thick being capable of formed from an identical plating bath as a intermediate material were stacked each by 10 layers so that the thickness of the main magnetic film was 1 µm. A material of 100 nm thickness of a composition identical to that of the main magnetic film was used as the under layer substrate for the plating and a plating film thickness with compensation for the decrement of the film thickness is necessary since the upper magnetic pole 11 is subjected to removal of the under layer, size controlling and planarizing CMP fabrication in the subsequent step after plating. The film thickness for the uppermost surface layer (tenth layer of the main magnetic film) was made to 2200 nm. As a result of applying the magnetic pole piece 11 to the thin film magnetic head, the O/W characteristics were changed from −18 dB to −23 dB at the recording frequency: f=800 MHz and improvement for the characteristics was recognized as the thermal protrusion was decreased from 15 nm to 12 nm. The thin film magnetic head has the same constitution as that for the first embodiment except for using the Fe—Ni system alloy plating film for the upper magnetic core 10.

A third embodiment is described by way of another example of applying the invention to the upper magnetic pole piece 11. Along with an improvement in the O/W characteristics, a problem of side erasure occurs in which data in the tracks adjacent to the recorded track are erased in the medium. As a countermeasure, the magnetic pole film is constituted with Bs gradient such that Bs decreases as it recedes from the vicinity of the recording gap film 17, that is, in the direction of the film thickness. This can concentrate the magnetic field output to the vicinity of the magnetic gap to decrease the magnetic field output to the adjacent tracks.

After the recording gap film 17 is formed, an under layer film (Au/Cr=15 nm/5 nm) for plating is formed by a sputtering method. The under layer film is designed so as to have a film thickness contained in the recording gap film 17. Successively, continuously stacked five layer films each layer having 200 nm thickness were prepared in the order of: 67 to 73Fe-27 to 33Co-0 to 2Ni film at high Bs of 2.4 T, 50 to 54Fe-32 to 36Co-12 to 16Ni film at Bs of 2.2 T, 50 to 54Fe-27 to 31Co-17 to 21Ni film at Bs of 2.0 T, 54 to 58Co-17 to 21Ni-23 to 27Fe film at Bs of 1.8 T, and 54 to 58Co-26 to 30Ni-14 to 18Fe film at Bs of 1.6 T successively. Also in this embodiment, in view of the decrement in the film thickness in the subsequent step in the same manner as in the second embodiment, a 54Fe-45Ni-1Co outermost surface film at Bs of 1.70 T is plated to 2300 nm thick. As a result of applying the magnetic pole end to the thin film magnetic head, the side erasure could be decreased by the erasing amount from about 30 nm to 25 nm on one side of the track. Further, it was confirmed for the improvement of the characteristics that the O/W characteristics charged from −18 dB to −23 dB at the recording frequency: f=800 MHz, and the thermal protrusion was reduced from 15 nm to 11 nm.

A fourth embodiment is described below by way of example of applying the invention to the lower magnetic pole piece 12. Characteristics most required for the lower magnetic pole piece 12 are high Bs characteristics like in the upper magnetic pole piece 11. Since the lower magnetic pole has a larger patterned shape and the thickness control for the stacked film is easier compared with the upper magnetic pole piece 11 and the upper magnetic core 10, a material different from the main magnetic film can be selected as the interlayer material. Using 70 wt % FeCo at high Bs of 2.4 T as the main magnetic film and NiP plating as the interlayer material, a stacked film (70FeCo/NiP=150 nm/3 nm)×20 layers was prepared. For the magnetic characteristics of the stacked film, Hk was decreased as from 18 Oe (1440 A/m) to 10 Oe (800 A/m) compared with the existent 70FeCo (film thickness: 3 μm). In a case of a structure in which the lower magnetic pole piece 12 is exposed on the side of the air bearing surface with respect to the medium, when the thickness of NiP as the non-magnetic film is increased, it functions as a gap to result in leakage magnetic fields in the area other than the vicinity of the recording gap. It has been found that the O/W characteristics were severely deteriorated due to the leakage magnetic fields. While the O/W characteristics are improved at the NiP film thickness of about 2 to 10 nm, it is desirable to reduce the film thickness within a controllable range. Plating was conducted by the method of repeating plating with each of the compositions and washing with water alternately for 70FeCo/150 nm=DC current of 250 mA×20 min, and NiP/3 nm=pulse current×30 sec. The pulse plating conditions were set to Ton/Toff=40 ms/960 ms, and Ion/Ioff=2400 mA/10 mA, and Ioff current was applied during Toff to prevent etching to the plated layer. As a result of applying the magnetic pole end to the thin film magnetic head, an improvement in the characteristics was confirmed for the O/W characteristics as from −18 dB to −22 dB, and for the thermal protrusion as from 15 nm to 12 nm at the recording frequency: f=800 MHz. Further, when Cr or Pd, Rh, Ru, Re, Mo or Ir was used trially instead of NiP as the interlayer material, it was confirmed that the O/W characteristics were improved by about 2 to 4 dB. The thin film magnetic head has the same constitution as that for the first embodiment except for using the FeNi system alloy plating film as the upper magnetic core 10.

A fifth embodiment is described below by way of another example of applying the invention to the lower magnetic pole piece 12. This has a structure of stacking the film constitution of the upper magnetic pole piece 11 described for the third embodiment from the recording gap film 17 downwardly in the order identical therewith. As an under layer film for plating, 54 to 58Co-26 to 30Ni-14 to 18Fe film of 100 nm thickness was formed by a sputtering method and, successively, four stacked plating films each at a thickness of 200 nm were prepared in the order of a 54 to 58Co-17 to 21Ni-23 to 27Fe film at Bs of 1.8 T, a 50 to 54Fe-27 to 31Co-17 to 21Ni film at Bs of 2.0 T, a 50 to 54Fe-32 to 36Co-12 to 16Ni film at Bs of 2.2 T, and a 67 to 73Fe-27 to 33Co-0 to 2 Ni film at Bs of 2.4 T.

Also in this embodiment, the 67 to 73Fe-27 to 33Co-0 to 2Ni outermost surface film at Bs of 2.4 T was plated to a thickness of 1300 nm while considering the decrement of the film thickness in the subsequent step (under layer removing and planarizing fabrication). As a result of applying the magnetic pole piece 12 to the thin film magnetic head, side erasure could be decreased by the erasing amount from 30 nm to 26 nm on one side of the track. Further, it was confirmed for the improvement of the characteristics that O/W characteristics changed from −18 dB to −23 dB at the recording frequency: f=800 MHz and the thermal protrusion was decreased from 15 nm to 11 nm.

A sixth embodiment is described below by way of example of applying the invention to the lower magnetic core 13. The low magnetic core 13 is required to exhibit characteristics of high specific resistivity ρ in order to attain a high magnetic field output at higher recording frequencies. Since, as with the lower magnetic pole piece 12, the lower magnetic core 13 has a larger patterned shape and its thickness control of the stacked film is easier, a material different from the main magnetic film can be selected as the interlayer material. While 52 to 56 wt % FeNi having characteristics of high ρ of 45 μΩcm was used, characteristics of higher ρ are obtainable by using NiP plating as the interlayer material while using the above-mentioned film as the main magnetic film. A stacked film (56FeNi/NiP=100 nm/5 nm)×20 layers was prepared by using the NiP plating conditions described for the fourth embodiment. For the magnetic characteristics of the stacked film, Hk could be lowered from 8 Oe (640 A/m) to 4 Oe (320 A/m) and ρ can be increased from 45 μΩcm to 50 μΩcm, compared with the existent 56FeNi (film thickness: 2 μm). As a result of applying the lower magnetic core 13 to the thin film magnetic head, the improvement of the characteristics was confirmed, that is, the O/W characteristics were changed from −18 dB to −21 dB at the recording frequency: f=800 MHz. Further, Cr, Pd, Rh, Ru, Re, Mo, Ir and the like were each used as a trial instead of NiP as the interlayer material. As a result, it was confirmed that O/W characteristics were improved by about 2 to 3 dB in each of the cases. The thin film magnetic head has the same constitution as that for the first embodiment except for using the FeNi system alloy plating layer as the upper magnetic core 10.

Figure 8:
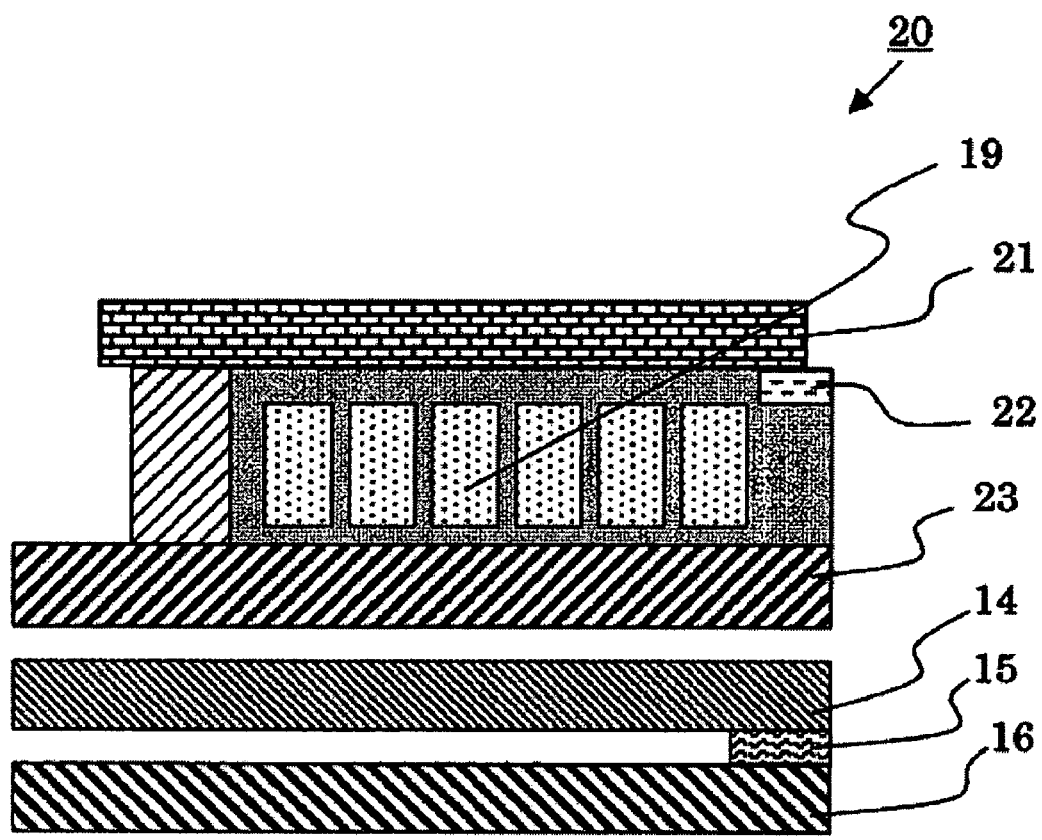
FIG. 8 is a cross-sectional view of a vertical recording type thin film magnetic head according to an embodiment of the invention.

A vertical recording type thin film magnetic head 20 adopting the invention is shown in FIG. 8 as a seventh embodiment. A stacked film (88FeNi/20FeNi)×10 layers was prepared as the upper yoke 21, a stacked film (70FeCo/NiP=150 nm/3 nm)×20 layers was prepared as the main magnetic pole piece 22, and a stacked film (56FeNi/NiP=100 nm/5 nm)×20 layers was prepared as the auxiliary magnetic pole piece 23. As a result, compared with the existent vertical recording type thin film magnetic head, it could be confirmed that the head could be used effectively also in a high frequency region without lowering of O/W characteristics.

Figure 9:
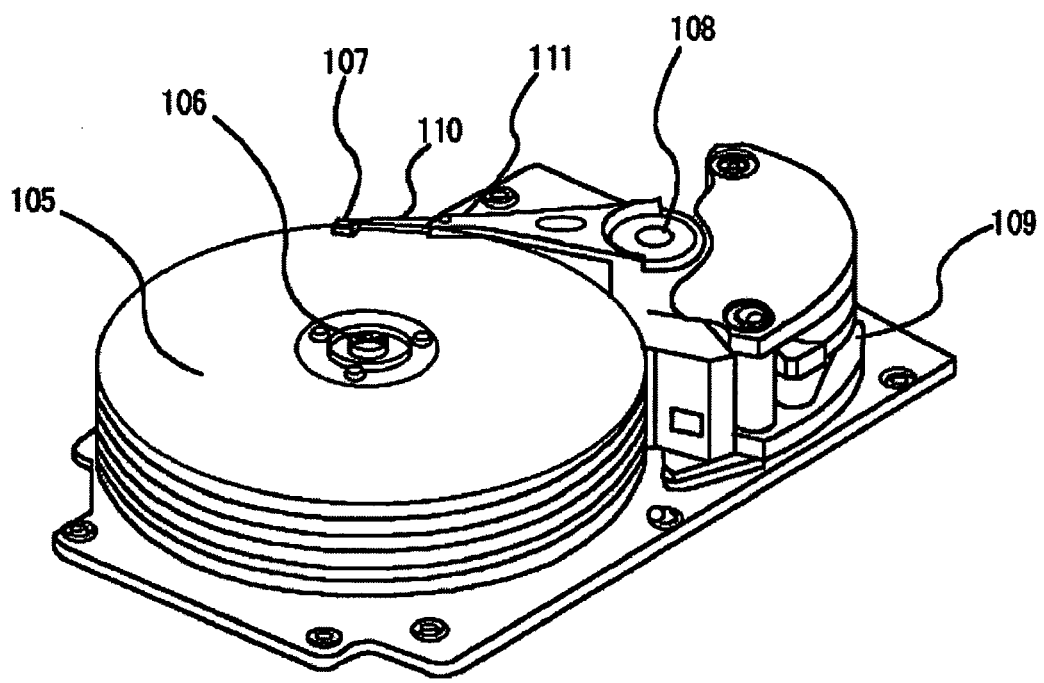
FIG. 9 is a configurational view of a magnetic disk drive mounting thereon a thin film magnetic head according to an embodiment of the invention.

FIG. 9 shows a magnetic disk drive mounting thereon a thin film magnetic head according to one of the embodiments of the invention. The magnetic disk drive comprises magnetic disks 105 for recording information, a spindle motor 106 for rotating the magnetic disks 105, thin film magnetic heads 107 for writing and reading information to and from the magnetic disks 105, an actuator 108 for positioning the thin film magnetic heads 107 to a target position on each of the magnetic disks 105, and a voice coil motor 109. The magnetic disk drive further includes guide arms 111 each of which fixes a suspension 110 for stable flying with a sub-micron space or gap defined between the thin film magnetic head 107 and the magnetic disk 105 and which are driven by the actuator 108 and the voice coil motor 109 during writing and reading. Further the disk drive also comprises a magnetic disk rotation controlling system, a head positioning control system and a recording/writing signal processing system, which are not illustrated.

Since the magnetic disk drive can perform satisfactory recording and writing in a high frequency region, it can attain an increase in the data transfer rate and an increase in the recording density.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A thin film magnetic head comprising:
a lower magnetic core;
a lower magnetic pole piece disposed at a top end of the lower magnetic core;
an upper magnetic core;
an upper magnetic pole piece disposed at a top end of the upper magnetic core;
a magnetic gap disposed between the lower magnetic pole piece and the upper magnetic pole piece; and
conductor coils covered with an insulator and disposed between the lower magnetic core and the upper magnetic core;
wherein a magnetic film of one of the upper magnetic core and the upper magnetic pole piece includes:
at least four layers of first thin magnetic plating films each having a thickness of about 50 to 500 nm; and
second thin magnetic plating films each having a thickness of about 2 to 10 nm, and a composition different from compositions of the first thin magnetic plating films, and being disposed between the first thin magnetic films;
wherein in a case where the upper magnetic pole piece is the magnetic film, each first thin magnetic plating film is a 66 wt % Fe-33 wt % Co-1 wt % Ni film and each second thin magnetic plating film is a 56 wt % Co-19 wt % Ni-25 wt % Fe film.

2. A thin film magnetic head comprising:
a lower magnetic core;
a lower magnetic pole piece disposed at a top end of the lower magnetic core;
an upper magnetic core;
an upper magnetic pole piece disposed at a top end of the upper magnetic core;
a magnetic gap disposed between the lower magnetic pole piece and the upper magnetic pole piece; and
conductor coils covered with an insulator and disposed between the lower magnetic core and the upper magnetic core;
wherein the upper magnetic pole piece comprises a magnetic film in which a 67 to 73 wt % Fe-27 to 33 wt % Co-0 to 2 wt % Ni plating film, a 50 to 54 wt % Fe-32 to 36 wt % Co-12 to 16 wt % Ni plating film, a 50 to 54 wt % Fe-27 to 31 wt % Co-17 to 21 wt % Ni plating film, a 54 to 58 wt % Co-17 to 21 wt % Ni-23 to 27 wt % Fe plating film and a 54 to 58 wt % Co-26 to 30 wt % Ni-14 to 18 wt % Fe plating film, each having a thickness of about 200 nm, are stacked in a direction of the film thickness thereof from a portion on the magnetic gap.

3. A thin film magnetic head comprising:
a lower magnetic core;
a lower magnetic pole piece disposed at a top end of the lower magnetic core;
an upper magnetic core;
an upper magnetic pole piece disposed at a top end of the upper magnetic core;
a magnetic gap disposed between the lower magnetic pole piece and the upper magnetic pole piece; and
conductor coils covered with an insulator and disposed between the lower magnetic core and the upper magnetic core;
wherein the lower magnetic pole comprises a magnetic film in which a 54 to 58 wt % Co-17 to 21 wt % Ni-23 to 27 wt % Fe plating film, a 50 to 54 wt % Fe-27 to 31 wt % Co-17 to 21 wt % Ni plating film, a 50 to 54 wt % Fe-32 to 36 wt % Co-12 to 16 wt % Ni plating film, and a 67 to 73 wt % Fe-27 to 33 wt % Co-0 to 2 wt % Ni plating film, each having a thickness of about 200 nm, are stacked from the lower magnetic core to the magnetic gap.

* * * * *

UNITED STATES PATENT AND TRADEMARK OFFICE
CERTIFICATE OF CORRECTION

PATENT NO. : 7,485,378 B2  
APPLICATION NO. : 11/084683  
DATED : February 3, 2009  
INVENTOR(S) : Oikawa et al.

Page 1 of 1

It is certified that error appears in the above-identified patent and that said Letters Patent is hereby corrected as shown below:

Column 2, line 14, please delete "L=0.006 pH" and insert -- L=0.006 µH --

Signed and Sealed this

Thirty-first Day of March, 2009

JOHN DOLL  
*Acting Director of the United States Patent and Trademark Office*